United States Patent [19]

Owen, Jr. et al.

[11] 3,751,997

[45] Aug. 14, 1973

[54] MULTI-DIRECTIONAL INDEXING APPARATUS

[75] Inventors: William L. Owen, Jr., William L. Woods, Jr., both of Shreveport, La.

[73] Assignee: Western Electric Company, Incorporated, New York, N.Y.

[22] Filed: July 24, 1972

[21] Appl. No.: 274,466

[52] U.S. Cl. .......................... 74/89, 74/57, 214/1 BB
[51] Int. Cl. .......................... F16h 25/12
[58] Field of Search .................. 74/57, 89; 33/18 B, 33/23 C, 23 H; 214/1 B, 1 BB

[56] References Cited

UNITED STATES PATENTS

| | | | |
|---|---|---|---|
| 1,642,369 | 9/1927 | Hendrickson | 33/18 B |
| 2,581,109 | 1/1952 | Kenngott | 33/18 B |
| 3,059,482 | 10/1962 | Petzoldt | 74/57 X |
| 3,703,834 | 11/1972 | Beezer | 33/18 B |

*Primary Examiner*—Allan D. Herrmann
*Attorney*—W. M. Kain, R. P. Miller et al.

[57] ABSTRACT

A multi-directional indexing apparatus utilizes a multi-revolution cam driving mechanism to index X and Y cross-slide assemblies, intercoupled by a unique type of floating pivot, in such a manner that both coordinate and non-coordinate (i.e., random) indexing along a predetermined pattern of index points is possible. In addition, the floating pivot, in response to each incremental displacement of the X cross-slide assembly, effectively presents a new Y indexing cam face to an associated Y cam follower. This advantageously obviates the need for any common, recurring cam groove index points, and/or complex cam groove cross-overs and/or indexable cam axis displacements. The floating pivot is also capable of providing a mechanical leverage in indexing along either coordinate or non-coordinate index points. This, in turn, maximizes the number of cam groove convolutions that may be formed in the periphery of a given sized cam.

18 Claims, 12 Drawing Figures

MULTI-DIRECTIONAL INDEXING APPARATUS

BACKGROUND OF THE INVENTION

1. Field of the Invention

This invention relates to indexing apparatus and, more particularly, to drive mechanisms for indexing a work-piece support table (or other auxiliary apparatus) along a predetermined pattern defined by a plurality of index positions that may or may not coincide with coordinate X-Y matrix points.

2. Description of the Prior Art

Most X-Y indexing drive mechanisms employed heretofore utilize either cams with specially contoured peripheral profiles or driven screws coupled to cross-slide assemblies. In either case, incremental X and Y displacements of a work table, for example, are normally chosen so as to coincide with a coordinate array of X-Y points forming a matrix. While most motor driven screw type feeds can be programmed to effect variable incremental X and Y table displacements, such motors are normally pulsed to effect the indexing of the work table by successive, fixed increments in order to insure precision indexing. Should non-coordinate indexing of a motor driven work table be desired, the necessary programming of the analog or digital signals for the stepping motors can become quite complex and expensive.

As for specially profiled driving cams, their versatility has generally been restricted by the fact that they normally function as single revolution cams. By this is meant that regardless how many incremental indexing periods are employed, such as represented by lobes (and/or roots) formed in the periphery of a given cam, such as a Y cam, the profile of the cam must be formed so that after the work table has been indexed along one Y row of coordinate points, normally defined within one half revolution of the cam (or some other fractional part of a revolution), the second half revolution will result in the work table being indexed in the opposite direction along an adjacent Y row of coordinate points. As such, while two 180° peripheral cam segments of a driving Y cam, for example, may be contoured so that two adjacent Y rows may define a different number of index dwell positions, and/or a different combination of spacings between positions in each row, a serious disadvantage of such cams is that the corresponding top and bottom Y dwell positions in adjacent rows must normally coincide laterally with common X rows, unless rather complex and expensive apparatus is employed to engage and disengage multiple surface-contoured indexing cams.

In an attempt to increase the flexibility and simplicity of X-Y indexing mechanisms, an indexing drive mechanism has been developed which utilizes two single revolution roll cams mounted on a common shaft, each roll cam being associated with an X and a Y cross-slide assembly, respectively, and with the Y cross-slide assembly being mounted on the X cross-slide assembly and intercoupled thereto, through the utilization of a fixed pivot type of Y cam follower arm. Such a roll cam indexing mechanism, with appropriate stepped index-defining cam grooves, allows selective displacement of a work table in the X and Y directions with considerable precision. However, in being single revolution roll cams, the associated cam followers necessarily retrace the same closed-loop cam grooves after each revolution of the roll cams.

In an attempt to increase the versatility of single revolution index cams heretofore, two modifications have been employed, one involves the use of so-called boat-follower cam groove cross-overs, and the other involves cam shaft axis indexing. In either case, a stepped cam groove configuration with multiple convolutions may be formed in juxtaposition around the circumference of the roll cam, but normally not in a helical fashion.

With respect to boat-follower cross-overs, they present problems with respect to roll cam reversibility, as well as with respect to precision indexing. In addition, the number of discrete or independent cam groove segments are normally limited to four, based on two cross-overs in a closed, end-to-end type of figure 8 configuration. As such, the degree of indexing versatility is still rather limited.

Lateral indexing of a roll cam shaft itself, of course, presents additional problems with respect to not only the mounting and driving of such an axially displaceable cam shaft, but to the problems involved in effecting automated programmed indexing thereof in a sequential manner with the cam-initiated X and Y incremental displacements of the work table. Moreover, a smooth, continuous, helical cam groove profile, with cycloidal indexing portions, is normally not possible, particularly in those regions associated with indexing of the cam axis.

In addition to a need for a versatile indexing drive mechanism which allows not only X-Y coordinate indexing, but non-coordinate (random) indexing, there has also been a need for an indexing drive mechanism that makes possible sequentially controlled angular rotation of an index table, relative to an initial position, so as to satisfy certain requirements in connection with operating heads or tooling successively brought into relative alignment with articles or workpieces supported on the index table. It is to be understood, of course, that while reference is made herein, for the purposes of illustration, to the successive, incremental indexing of a plurality of articles or piece parts, supported on an index table, into alignment with one or more operating heads, the drive mechanism can just as readily be employed to index such heads into successive alignment with a plurality of articles or workpieces supported on a stationary table.

SUMMARY OF THE INVENTION

It, therefore, is an object of the present invention to provide a new and improved indexing apparatus wherein the X-Y indexing drive mechanism thereof allows precise, incremental indexing of an index table (or other apparatus) secured thereto along a pattern defined by a plurality of index positions that may or may not coincide with coordinate X-Y matrix points.

It is a further object of the present invention to provide a new and improved multi-revolution roll cam indexing drive mechanism that is capable of successively indexing a work table (or other apparatus) supported thereon, along a pattern defined by a predetermined array of coordinate and/or non-coordinate dwell positions, relative to a fixed point, with neither the starting nor ending dwell positions in any two adjacent rows nor the number of dwell positions in any one row having to be identical with those in any other row.

It is an additional object of the present invention to provide a new and improved multi-revolution roll cam indexing drive mechanism that is capable of indexing, with selective mechanical leverage, a work table (or other apparatus) along a pattern defined by any desired number of coordinate and/or non-coordinate points, such indexing being with or without selective coordinated table rotation, and accomplished without the need for multiple, selectively engaging X and/or Y cams, or cam groove cross-overs, or lateral cam shaft indexing.

In accordancewith the principles of the present invention, the indexing apparatus comprises a unique drive mechanism which includes two multi-revolution roll cams, one having a stepped X index-defining cam groove formed circumferentially about and preferably extending in continuous helical fashion axially along the periphery thereof, and being directly coupled through an X cam follower to an X cross-slide assembly. The other multi-revolution roll cam also has a stepped Y index-defining cam groove formed circumferentially about and extending in continuous helical fashion axially along the periphery thereof, and being indirectly coupled through a Y cam follower to a Y cross-slide assembly. The latter is slidably mounted on the X cross-slide assembly for Y displacement relative to X displacement. In the illustrative embodiment, an index table is also indirectly mounted on the Y cross-slide assembly and, thus, is responsive to the displacements of both the X and Y cross-slide assemblies.

In accordance with an aspect of the invention, the Y cross-slide assembly is indirectly coupled to the X cross-slide assembly through a unique, X displaceable floating pivot. More specifically, this floating pivot comprises, in part, an L-shaped Y cam follower arm that is pivotally mounted at the vertex thereof on, and is movable with, the X cross-slide assembly. The L-shaped Y cam follower arm indirectly connects a Y cam follower, communicating with the Y cam groove formed in the Y roll cam, to the Y cross-slide assembly. Such a coupling arrangement advantageously facilitates displacement of the Y cross-slide assembly not only selectively in response to any angular orientation of any given stepped Y index-defining cam groove portion that communicates with the Y cam follower, relative to a perpendicular plane through the axis of the Y roll cam, but also selectively in response to any displacement of the X cross-slide assembly.

One of the most significant and beneficial results realized with the unique type of intercoupling employed betwen the X and Y cross-slide assemblies is that it allows any appreciable movement of the X cross-slide assembly, by itself, to displace the Y cam assembly by an amount sufficient to effectively present a new, and independent Y cam groove portion, or face, to the Y cam follower.

As such, the Y cam follower never has to return to the same or common starting point in the Y cam groove (e.g., every 180° or 360° ) whenever the top or bottom Y index points in adjacent Y rows, for example, fall along the same corresponding X axis. To this end, the floating pivot feature also obviates the need for any complex and expensive boat-follower cross-overs, as the multi-revolution roll cams embodied in the present invention allow the use of continuous, essentially helically formed cam grooves. As such, the roll cams may be readily reversed after the X and Y cam followers have traveled along the respective cam grooves from one end to the other, with all of the previous indexing positions (coordinate or random) being accurately retraced during the reverse rotation of the roll cams. Moreover, this is accomplished with no need for cam axis indexing.

Another advantage of the multi-revolution X-Y roll cam drive mechanism embodied herin is that the floating Y cam follower arm may be utilized to provide a form of mechanical leverage with respect to Y displacement. More specifically, the X-initiated Y displacement allows the degree of Y displacement between any two adjacent Y index points to be far greater for a given degree of angular displacement of the Y cam groove, relative to a plane through the axis of the Y roll cam, than would be possible with a drive mechanism wherein Y displacement is effected by the Y cam only. Such compound X and Y roll cam-initiated Y cross-slide assembly displacement thus allows the number of stepped Y groove convolutions, for example, to be maximized for a given sized Y cam. In addition, such mechanical leverage, of course, also greatly facilitates indexing to random index points which are either very closely spaced or widely spaced, as the X-initiated Y displacement may be either additive or subtrative, depending on the angular orientations of any given set of corresponding stepped X and Y index cam groove portions.

Concomitantly, cam grooves which require a minimum angular orientation in the stepped index-defining portions, in turn, minimize pressure angle difficulties often encountered in generating cam profiles, as well as minimize the problems of cam follower bounce, which can readily arise whenever cam surfaces or grooves abruptly change direction.

The compact, yet simplified indexing apparatus embodied in the present invention also allows for the index table (or other auxiliary work apparatus) to be readily mounted on a rotatable and indexable support. As such, the table may be sequentially displaced not only orthogonally (or diagonally as a result of compound X-Y movement), but rotationally as well. In certain applications such multidirectional index table displacement is very conducive to the automated insertion, for example, of components, devices or terminals into receiving slots (or sets of apertures) formed with different selective angular orientations in a circuit or terminal board.

DETAILED DESCRIPTION

Figure 1:
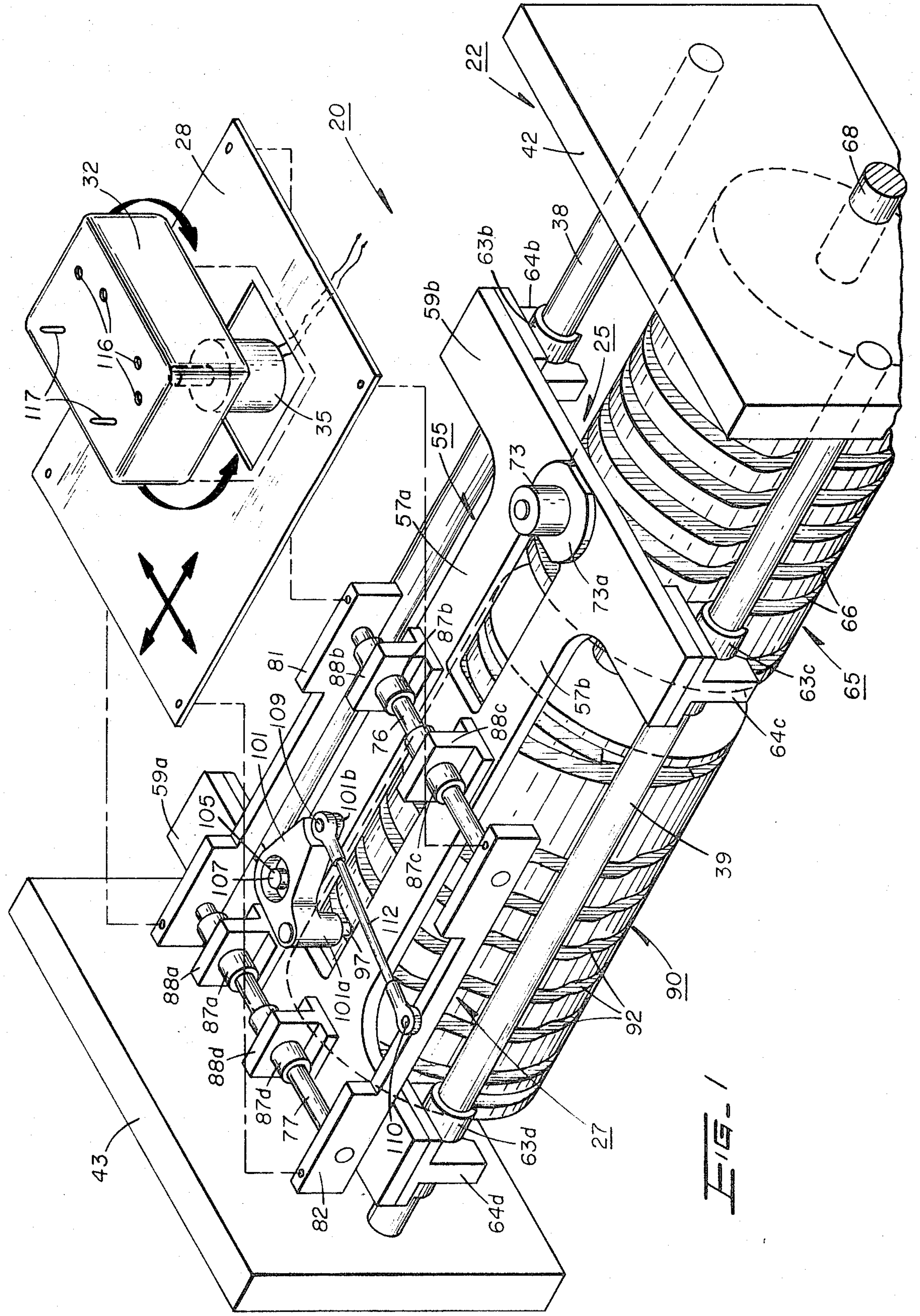
FIG. 1 is a perspective view of an indexing apparatus which utilizes a multi-revolution X-Y roll cam indexing drive mechanism with a floating pivot type of intercoupling between the X and Y cross-slide assemblies in accordance with a preferred embodiment of the present invention.
Figure 2:
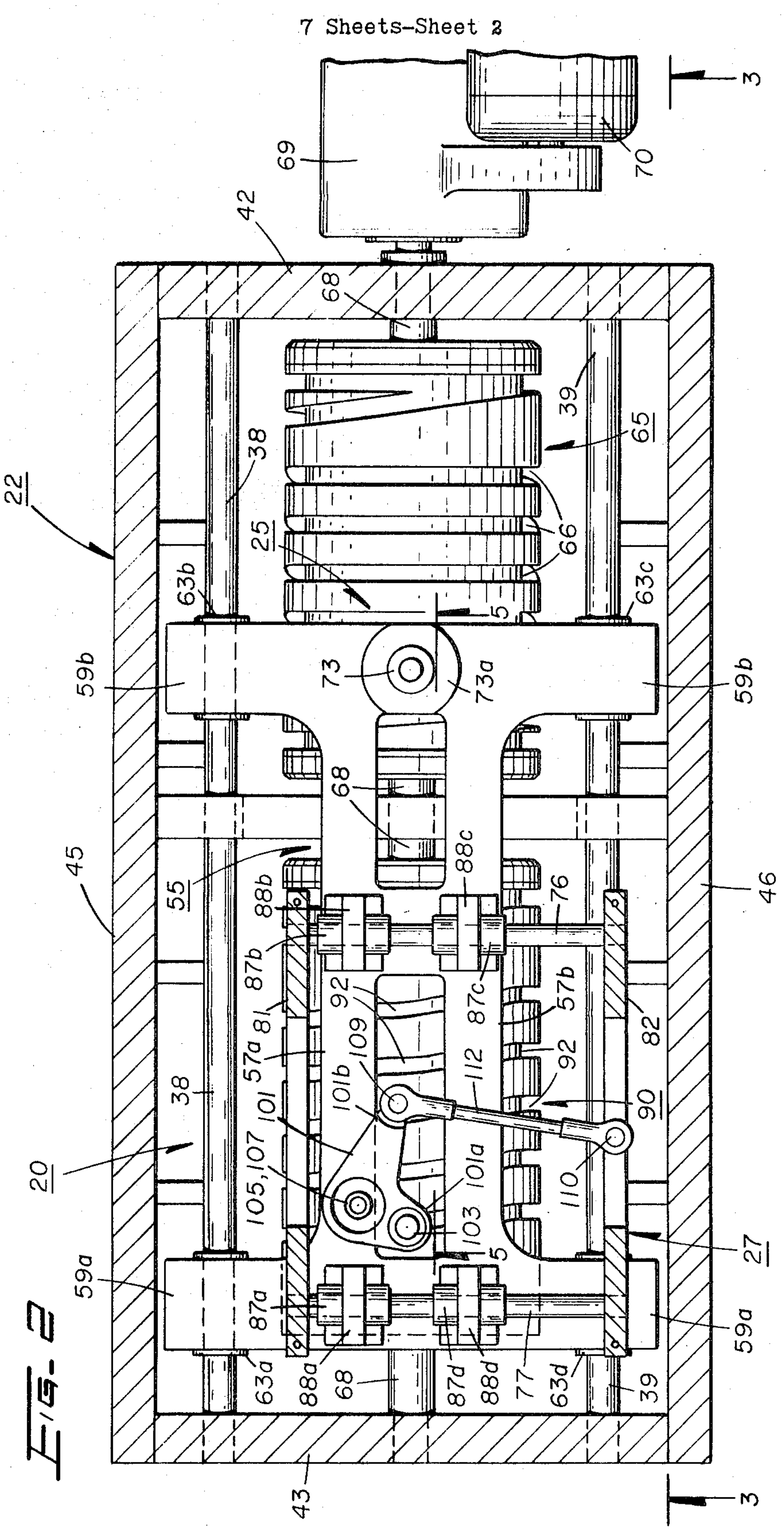
FIG. 2 is a plan view of the indexing drive mechanism depicted in FIG. 1.
Figure 3:
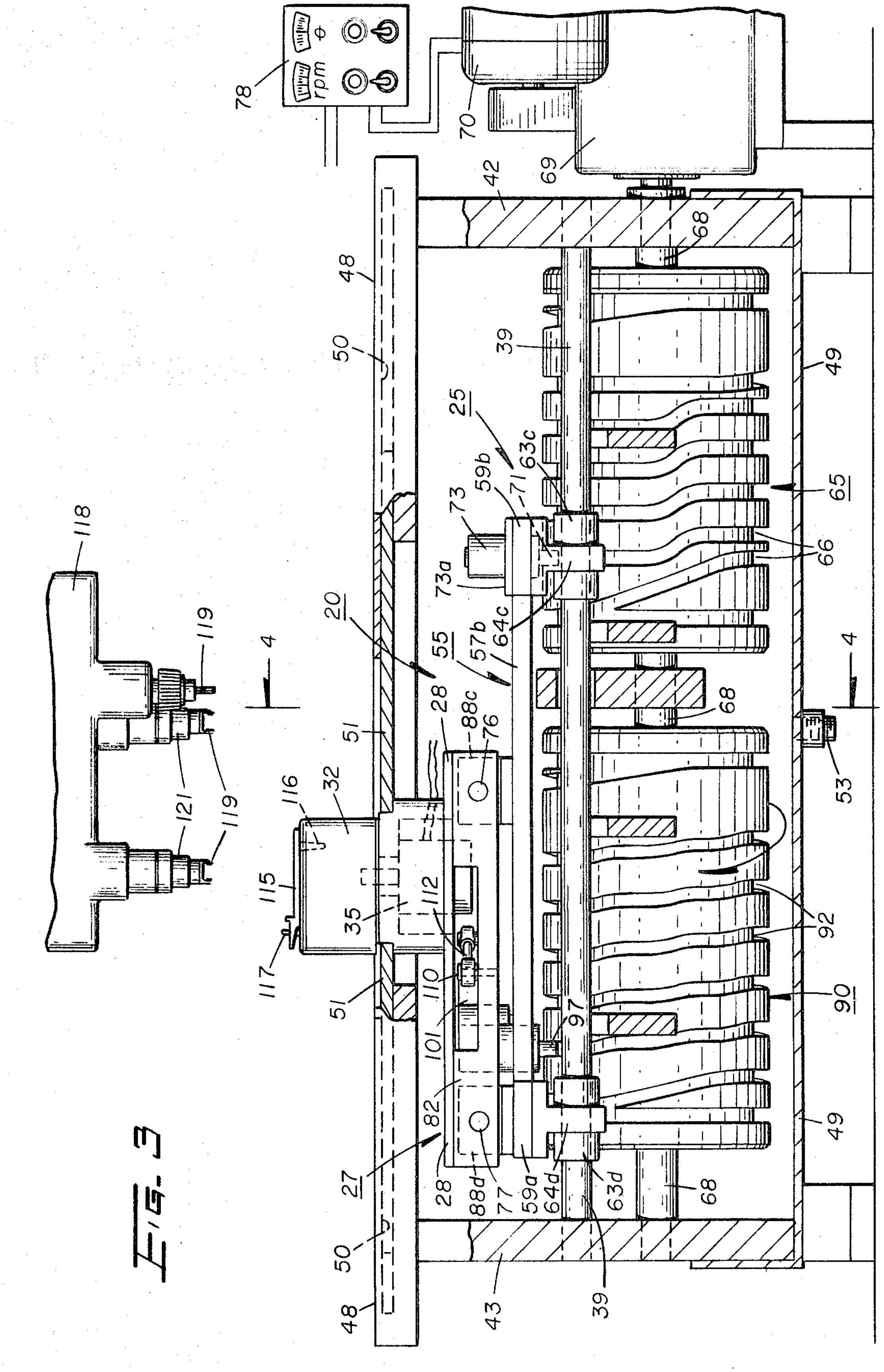
FIG. 3 is a side elevational view of the indexing drive mechanism depicted in FIGS. 1 and 2.

In accordance with the principles of the present invention, and with particular reference to FIGS. 1–3, an X-Y indexing apparatus designated generally by the reference numeral 20 comprises a stationary frame 22 (best seen in FIG. 2) upon which is supported for movement relative thereto X and Y cross-slide assemblies designated 25 and 27, respectively. As also best seen in FIG. 1, in an exploded view, a platform 28 and an index nest or work table 32 are supported on the Y cross-slide assembly directly and on the X cross-slide assembly indirectly in such a manner as to be moved thereby successively either in the X and/or Y directions, or at predetermined angles relative thereto in the said plane based on compound movement of the cross-slide assemblies.

In accordance withe one preferred embodiment of the invention, the X-Y index table 32 is actually supported on a rotational drive unit 35, the latter being secured to the support platform 28 (as depicted in FIG. 3) so as to allow displacement of the index table 32 not only successively or simultaneously in the X and Y directions, but also sequentially or simultaneously with such X-Y displacements in an angular direction, thus allowing multi-directional, or more specifically, three-dimensional displacement.

Considering the cross-slide assemblies now in greater detail, the X cross-slide assembly 25 comprises two supporting guide rods 38, 39 which are suitably secured at their respective common ends within bores or apertures of adjacent end plates 42, 43 which, in turn, form part of the stationary frame 22. As depicted in FIG. 2, the stationary frame also comprises side plates 45, 46, a top support and protective cover assembly 48 and an oil confining bottom base plate 49 (bset seen in FIGS. 3 and 4). The cover asembly 48 has a channel 50 formed therein which allows a slide plate 51 to move horizontally in any direction, within limits, defined by the periphery of the channel. As such, the slide plate 51 serves as a protective cover preventing foreign objects from falling down through the aperture in the platform 28 into the indexing drive mechanism. The bottom plate 49 has a tapped central aperture for receiving a threaded plug 53 so as to facilitate the draining of oil from the container-defining frame of the drive mechanism.

Slidably mounted on the X guide rods 38, 39 is an X yoke member 55, which is formed with two parallel and laterally extending intermediate leg portions 57*a,b* interposed between two mutually disposed end leg portions 59*a,b*. The X yoke member 55 is slidably mounted on the supporting guide rods 38 and 39 by means of bushings 63*a–d* and associated support brackets 64*a–d*, respectively, the latter being secured to the underside of the terminating ends of the leg portions 59a,b of the yoke member 55. Mounted as such, it is readily seen that the yoke member 55 of the X cross-slide assembly is capable of being driven laterally along the supporting guide rods 38, 39 within the limits defined between the frame end plates 42, 43.

Controlled movement of the X cross-slide assembly 25 is effected by a multi-revolution X roll cam 65 which preferably has a peculiarly configured X cam groove 66 formed in an extending in an essentilaly helical fashion axially along the periphery thereof. The cam groove 66 has a series of stepped X index-defining portions spaced therealong.

Figure 12:
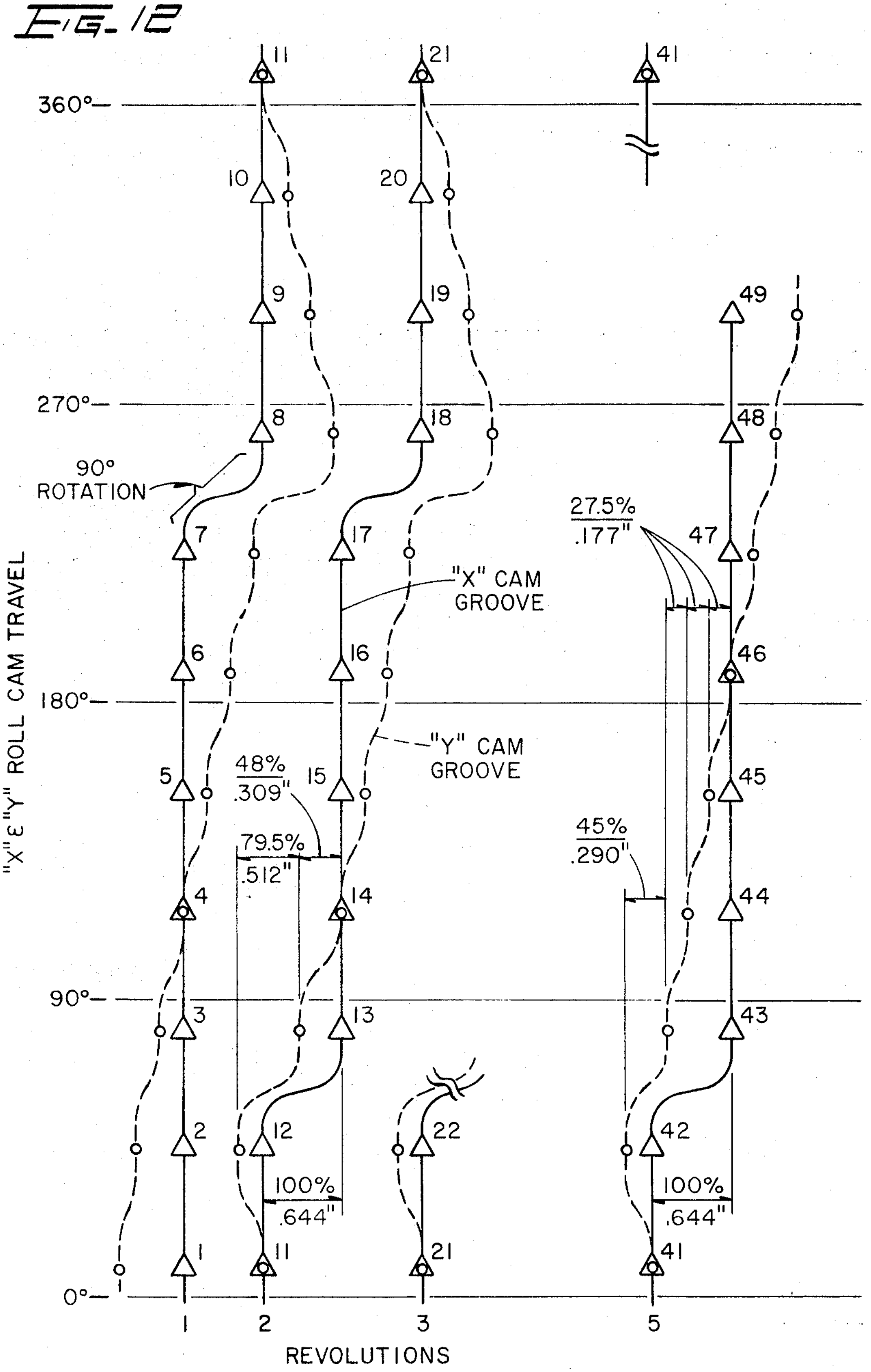
FIG. 12 is an enlarged, partial two-dimensional layout of the X and Y cam groove profiles respectively formed in the X and Y roll cams in order to allow the indexing drive mechanism to position successively the 49 terminal receiving locations on the terminal board depicted in FIGS. 9–11 in registry with the terminal insertion heads of the apparatus in accordance with the principles of the present invention.

It should be noted that the actual profiles of the cam groove index portions are preferably formed in the respective X and Y roll cams to effect cycloidal motion. This minimizes the problems associated with pressure angles and cam follower bounce. Such cycloidal motion is best seen in the fragmentary two-dimensional cam groove layout depicted in FIG. 12 and, in particular, in the segments going from terminal locations No. 7 to No. 8, No. 12 to No. 13, No. 17 to No. 18 and No. 42 to No. 43.

The X roll cam 65 is rotatably mounted on a cam shaft 68 which terminates and is journaled at one end within an aperture formed in the end plate 43, and which shaft near the other end extends a short distance through and is journaled within an aperture formed in the end plate 42 (as best seen in FIG. 3). The outwardly extending end of the cam shaft 68 is coupled through a conventional gear reducer 69 to a suitable power source, such as an electric motor 70. Any one of a number of conventional types of motors and associated control circuitry may be employed in a well known manner so as to control the direction, speed of rotation, and number of revolutions of the cam shaft 68 and, in turn, of the X roll cam 65 supported thereon (as well as a Y roll cam to be described hereinafter). By way of illustration only, a control cabinet 78 for housing the necessary control circuitry, including controls and meters associated therewith, is symbolically depicted in FIG. 3. Power leads are shown from the control cabinet directly to the cam shaft drive motor 70 and indirectly by detached contacts to the index table rotational drive source 35 (FIGS. 1 and 3).

Figures 4, 5, 9:
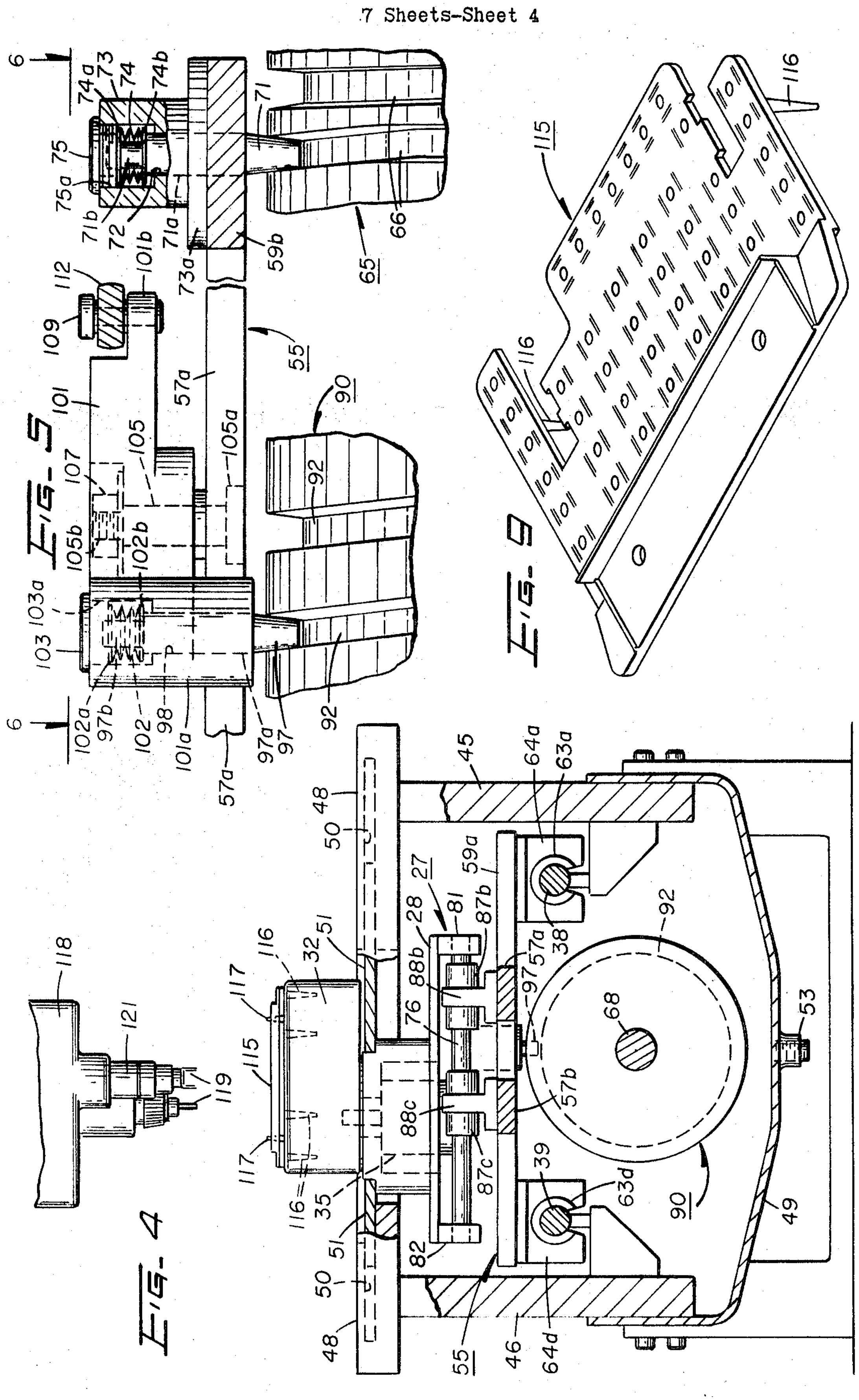
FIG. 4 is a cross-sectional view of the indexing drive mechanism taken along the line 4—4 in FIG. 3, and illustrates in greater detail the manner in which the X cross-slide assembly is mounted on the frame and is driven by the X roll cam.
FIG. 5 is an enlarged, partial front elevational view, taken partially in section along the line 5—5 in FIG. 2, and illustrates in greater detail portions of the X and Y roll cams, and the cam followers and cross-slide assemblies respectively associated therewith.
FIG. 9 is a perspective view of a typical molded terminal board which may be indexed with the present indexing drive apparatus, and which board has a plurality of terminal receiving apertures formed therein which are located at both coordinate and non-coordinate matrix points, as well as being formed so as to necessitate a 90° rotation of the terminal board to facilitate the insertion of terminals in certain of the receiving apertures.

A cam follower 71, best seen in FIGS. 3–5, is secured to the X yoke member 55 in such a manner as to be spring biased against and to continuously engage the X cam groove 66 at some point therealong and, thereby, control the X displacement of the X cross-slide assembly 25. The X cam follower 71 (as best seen in FIG. 5) extends through an aperture in the end leg portion 59*b* of the yoke member 55 and has an intermediate shank portion 71*a* which is journaled for slidable movement within a bore 72 of a support member 73. The latter is secured through a flange 73*a* to the upper surface of the leg portion 59*b* of the X yoke member 55. The cam follower 71 has an upper shank portion 71*b* of smaller diameter about which is mounted a suitable spring assembly comprising a plurality of stacked spring washers 74 interposed between two flat washers 74*a* and *b* in the illustrative embodiment. A plug 75 has an outer threaded wall portion 75*a* which engages the threads of a tapped bore formed in the upper surface of the support member 73. Arranged as such, the plug 75 exerts a biasing force, through the spring washers 74, against a shoulder of the cam follower 71 so as to facilitate the biasing of the latter against the base of the X cam groove 66.

The Y cross-slide assembly 27, with particular reference to FIGS. 1–3, comprises two Y-supporting guide rods 76, 77, the mutually disposed common ends of which are secured within aligned apertures of two Y support plates 81, 82. Raised upper end regions of the plates 81, 82 preferably have tapped holes formed therein so as to accommodate bolts or screws threaded through aligned holes of the platform 28 (as best seen in the exploded view of FIG. 1). In this manner the platform 28 is secured to the Y support plates 81, 82 which form a part of the Y cross-slide assembly 27.

The Y-supporting guide rods 76 and 77 have spaced pairs of bushings 87*a,b* and 87*c,d*, respectively, mounted thereon. Bushings 87*a–d* are, in turn, respectively secured by suitably apertured brackets 88*a–d* to the upper surface of the X yoke member 55. Mounted as such, the Y cross-slide assembly 27 is supported on and is capable of Y displacement relative to X displacement of the X cross-slide assembly 25.

Controlled displacement of the Y cross-slide assembly 27 is produced, in part, by means of a multi-revolution Y roll cam 90 which has a peculiarly configured Y cam groove 92 formed in and extending in an essentially helical fashion axially along the periphery thereof. The cam groove 92 has a series of stepped Y index-defining portions, preferably with cycloidal curvatures, spaced therealong. The Y roll cam 90, as in the case of the X roll cam 65, is axially mounted on and driven by the common cam shaft 68.

A Y cam follower 97, best seen in FIGS. 1, 3 and 5–8, is supported in such a manner as to be spring biased against and to continuously engage the Y cam groove 92. As such, the cam follower 97 at least, in part, controls the Y displacement of the Y cross-slide assembly 27. In contrast to the manner in which the X cam follower 71 is mounted directly to the X yoke member 55, the Y cam follower 97, for a very significant reason discussed in greater detail hereinbelow, is not directly secured to any portion of the Y cross-slide assembly 27. Rather, as best seen in FIGS. 1, 3 and 5, the upper major portion 97*a* of the Y cam follower 97 is journaled for slidable movement within a bore 98 formed near the terminating end of one leg portion 101*a* of a unique, L-shaped, Y cam follower arm 101. An upper end region 97*b* of the cam follower 97, as in the case of cam follower 71, has a plruality of spring washers 102 coaxially mounted thereon, and interposed between two flat washers 102*a* and *b*. A plug 103 has an outer threaded wall portion 103*a* which threadably engages a tapped upper region (of larger diameter) of the bore 98 formed in the cam follower arm 101. As thus assembled, the plug 103 exerts a compressive force against the spring washers 102 which, in turn, biases the cam follower 97 against the base of the Y cam groove 92.

In accordance with the principles of the present invention, the L-shaped cam follower arm 101, which actually resembles a bell crank, is pivotally mounted on a stub shaft 105 (best seen in FIG. 5) which, in turn, is secured to one intermediate leg portion 57*a* of the X yoke member 55. The stub shaft 105 has a head portion 105*a* and a threaded upper end shank portion 105*b* which is in threaded engagement with a nut 107, the latter exerting a pressure against upper and lower tapered roller bearings (not shown) employed to minimize back-lash in the cam follower arm 101.

Figure 7:
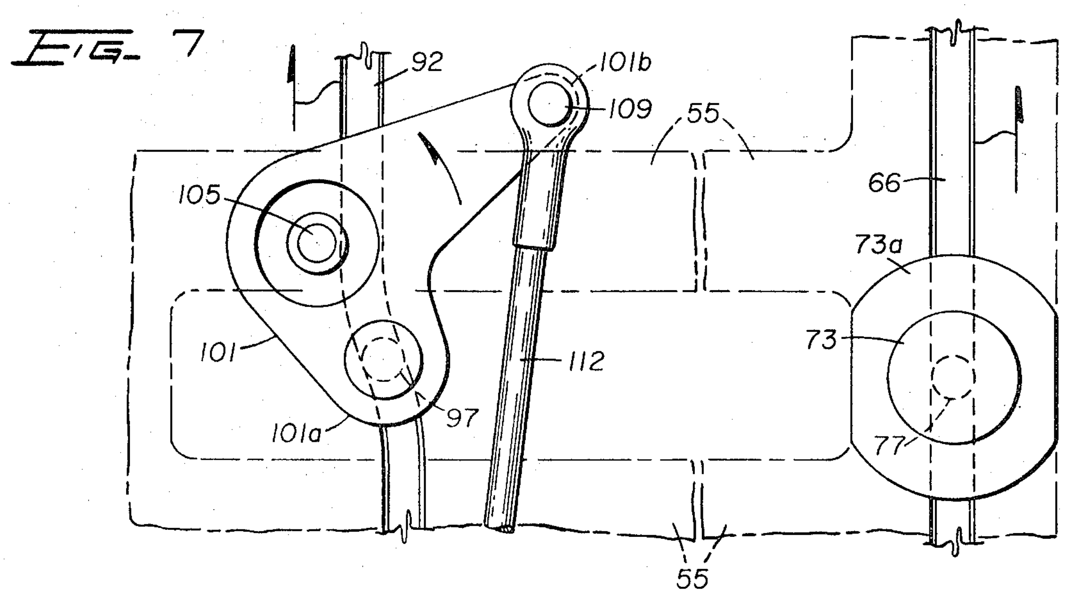

The end region 101*b* of the Y cam follower arm 101 (as best seen in FIGS. 1 and 2) is pivotally coupled through pins 109 and 110, and a connecting rod 112, to the Y cross-slide support plate 82. With such coupling, it is readily seen that any displacement of the Y cam follower 97 along the axis of the Y roll cam 90 (as depicted in FIG. 7), will cause the L-shaped cam follower arm 101 to pivot about the stub shaft 105 and, thereby, through the connecting rod 112, effect displacement of the Y cross-slide assembly 27. Such Y displacement is produced independently of any displacement of the X cross-slide assembly 25.

Conversely, if the Y cam groove 92 has no angular orientation relative to the axis of the Y roll cam 90 (see FIG. 8), but the X cam groove 66 does have such angular orientation relative to the axis of the X roll cam 65, then not only will the X cross-slide assembly 25 be displaced, but so will the Y cross-slide assembly 27. Such compound X-Y displacement is produced because as the X yoke member 55 is moved laterally in the X direction, the pivot point (stub shaft 105) of the Y cam follower arm 101 is likewise moved laterally relative to the Y cam follower 97 which, under the operating condition in question, remains in a linear section of a Y cam groove 92. As a result, the Y cam follower arm 101 actually is caused to pivot about the cam follower 97 rather than the stub shaft 105 on which the cam follower arm 101 is mounted. This pivotal action then causes the connecting rod 112 to displace the Y cross-slide assembly 27 in a direction dependent on the direction of pivotal movement of the cam follower arm 101.

Figure 6:
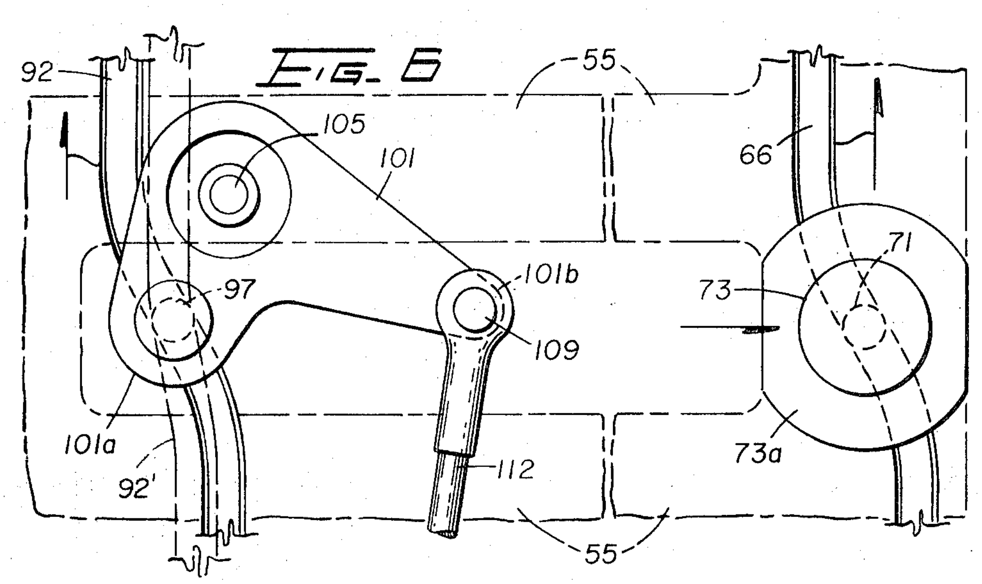
FIGS. 6–8 are enlarged, fragmentary detail plan views taken along the line 6—6 in FIG. 5, and illustrate in sequence the type of mechanical leverage and net Y displacement effected by the floating, pivotal Y cam follower arm in accordance with the principles of the present invention.
Figure 8:
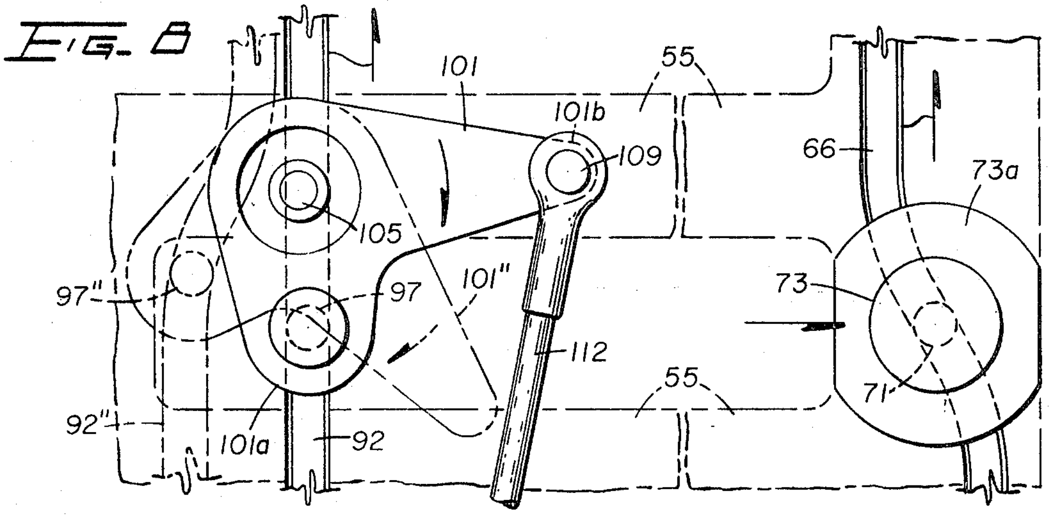

The significance of X-initiated Y displacement, as well as the manner in which selective X and Y, as well as compound X and Y displacements of the index table 32 are effected, will be best understood in connection with a more detailed examination of FIGS. 6–8. These figures respectively represent different types of X and Y displacements that are employed, or may be readily effected in indexing a terminal board 115, of the type depicted in FIGS. 9–11, under a multiple terminal insertion head 117 of conventional design, and only generally outlined in FIGS. 3 and 4. In the interest of clarity, like reference numerals are used to identify corresponding structural features in FIGS. 6–8.

In considering the various types of indexing movements made possible by the drive mechanism embodying the principles of the present invention, it is important to fully appreciate that it is the so-called floating pivot, or more specifically the X floating support of the Y cam follower arm 101 that permits not only Y-initiated Y table displacement, but X-initiated X and Y table displacements. As such, any Y cam initiated Y displacement can be augmented or amplified (or conversely reduced or cancelled), without having to form a section of the Y cam groove with an abrupt or sharp angular orientation relative to the axis of the Y roll cam. It is because the angle or pitch of the Y cam groove 92 can be limited to a much greater extent through the utilization of X-initiated Y displacement than if the latter did not exist, that the number of convolutions of the Y cam groove 92 formed in essentially helical fashion are, in actuality, limited primarily by only the permissible physical size of the Y roll cam itself, and the mechanical leverage produced by the Y cam follower arm 101.

Stated another way, the floating Y cam follower arm 101 allows each stepped index-defining convolution of the essentially helical Y cam groove 92 to be much more closely spaced than would otherwise be possible and, therefore, a greater number of juxtaposed cam groove convolutions may be formed for a given axial length of roll cam surface area. Minimized angular orientation of adjacent Y cam groove convolutions also minimizes pressure angle problems, as well as problems relating to cam follower bounce that are always of concern in laying out cam profiles.

Figures 10, 11:
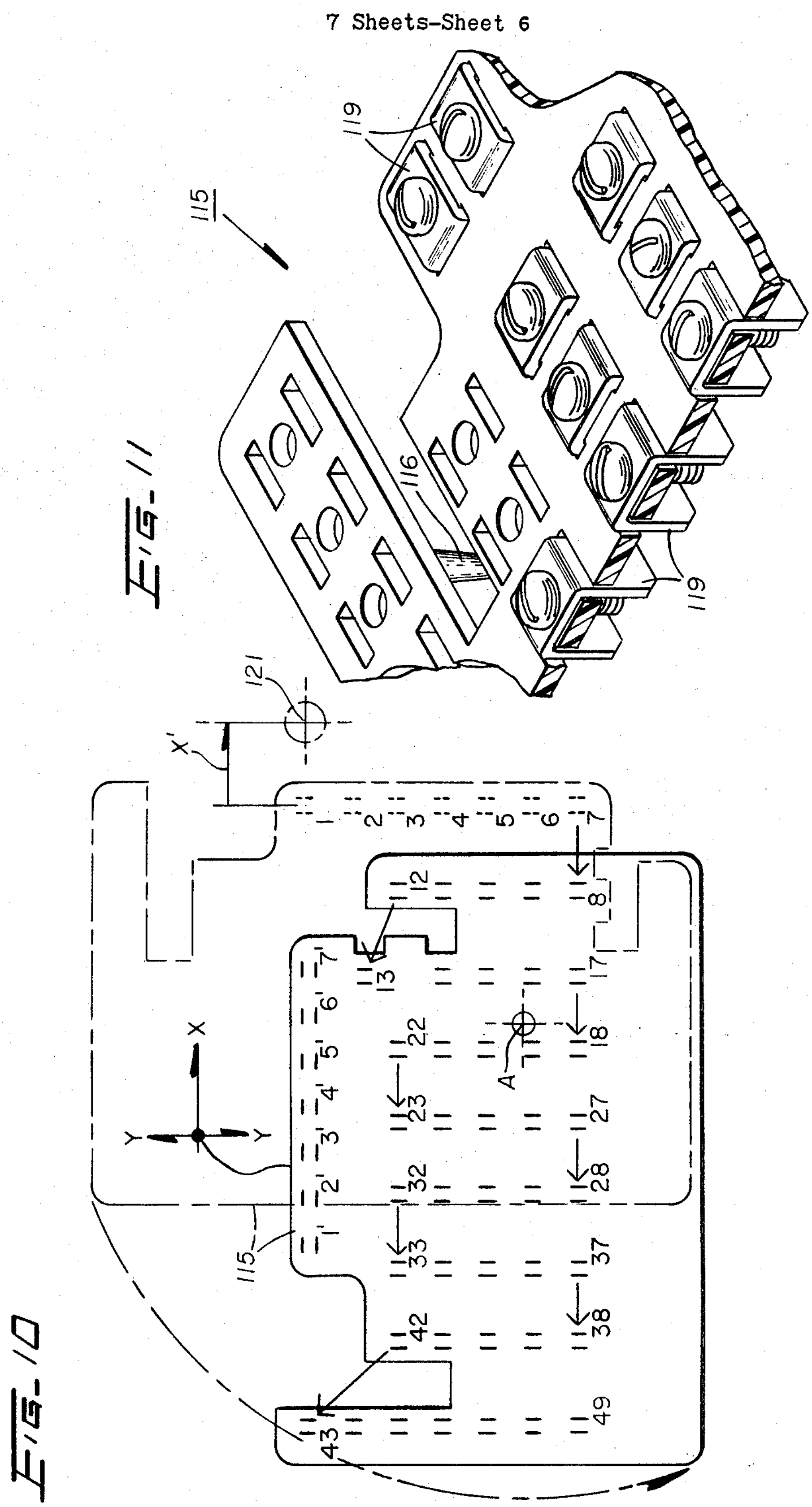
FIG. 10 is a plan view of the terminal board depicted in FIG. 9, mounted on the work table of the indexing mechanism, and illustrates in greater detail the orientation and location of both the coordinate and non-coordinate terminal receiving apertures formed in the terminal board.
FIG. 11 is an enlarged, fragmentary perspective view of the terminal board depicted in FIGS. 9 and 10, and further illustrates one particular type of electrical terminal inserted in some of the receiving apertures formed in the terminal board.

Attention is now directed particularly to FIGS. 6 and 10, and with reference to one specific application of the present invention involved in the insertion of U-shaped terminals 119, of the type depicted in FIG. 11, within preformed apertures, identified as terminal locations 1–49, in the illustrative terminal board 115. Wtih the X and Y cam followers 71 and 97 positioned at the left ends of the roll cams 65 and 90, respectively, as depicted in FIGS. 1–3, the terminal board 115 is initially mounted on the index table 32 in the vertical direction, as shown in phantom in FIG. 10, with a pair of integral, downwardly extending terminal board legs 116 positioned for insertion in mating holes of the index table. The table also has a plurality of upwardly extending pilot pins 117 (see FIG. 1) so as to provide accurate alignment of the terminal board.

With the terminal board 115 thus initially mounted on the index table 32 in the vertical position, the index table is then indexed laterally (to the right) as viewed in FIG. 10 by the distance designated X′ so as to position the first terminal location No. 1 directly under and in alignment with a particular one of the terminal insertion tools 121 of the multiple terminal insertion head 118.

Before considering the incremental Y displacements effected between terminal locations No. 1 and No. 7, for example, attention will be directed first to the manner in which the terminal board 115 is indexed laterally only by the distance designated X′ in FIG. 10. From an examination of FIGS. 6 and 12, it becomes evident that both the X and Y roll cams 65 and 90, respectively, must effect Y displacement of equal magnitude, but in opposite directions so as to result in a net zero displacement in the Y direction in indexing the distance X′.

This canceling out of oppositely initiated Y displacements can perhaps best be understood by examining the effect of the X and Y roll cams 65 and 90, respectively, on the movement of the Y cam follower arm 101, with particular reference to FIG. 6. More specifically, as a result of the particular angular orientation of that portion of the X cam groove 66 illustrated, and for the direction of rotation of the X roll cam indicated by the arrow, namely, clockwise, the X cam follower 71 will cause the yoke member 55 of the X cross-slide assembly 25 to move to the right, as viewed in the drawing. As the stub shaft 105, on which the Y cam follower arm 101 is mounted, is secured to the intermediate leg portion **57*a* of the yoke member 55, any movement to the right of the stub shaft 105 would normally tend to cause the Y cam follower arm 101 to effectively pivot about the Y cam follower 97 in a clockwise direction. This would normally result in a downward thrust imparted to the connecting rod 112, as depicted in FIG. 6, which would thus force the Y cross-slide assembly 27 to move downwardly, as veiwed in FIG. 2**, for example.

However, at the same time that the X cross-slide assembly 25 is attempting to initiate clockwise rotation of the Y cam follower arm 101, the particular angular orientation of that portion of the Y cam groove 92 depicted in FIG. 6 has the simultaneous effect, through the Y cam follower 97, of attempting to pivot the Y cam follower arm 101 counter-clockwise.

The desired net result, for the situation where X displacement only of the index table is desired, is that the X roll cam initiated Y displacement and the Y roll cam initiated Y displacement cancel out. This, of course, is the result that actually takes place initially in indexing the terminal board laterally (to the right) by the distance designated X′ in FIG. 10, as well as in indexing from one top or bottom Y row terminal location to a juxtaposed Y terminal location in lateral alignment therwith, i.e., along a common X row, such as between terminal locations No. 7 and No. 8, or No. 22 and No. 23, for example, of the terminal board.

After the terminal board 115 has been initially indexed laterally by the distance designated X′ in FIG. 10, it is thereafter incrementally indexed so as to successively position terminal board locations designated No. 1 through No. 7 in registry with the particular one of the terminal insertion tools 121 aligned therewith. In indexing from terminal locations No. 1 through No. 7, the successive corresponding circumferential portions of the X cam groove 66 are, of course, all oriented in a direction perpendicular to the axis of the X roll cam 65, as depicted in FIG. 7, and as also represented in the two-dimensional X cam groove layout in FIG. 12.

Conversely, the Y cam groove 92 is oriented at a predetermined angle relative to the axis of the Y roll cam 90 (best seen in FIG. 12) in those successive circumferential portions corresponding to the terminal locations No. 1 to No. 7, so as to effect the successive incremental Y displacements therebetween.

Considered more specifically, it is seen in FIG. 7 that for the direction of Y cam rotation indicated by the arrow, each time the associated cam follower 97 rides along a portion of the Y cam groove 92 which is angularly oriented (preferably cycloidally) in the direction shown, this will cause the floating Ycam follower arm 101 to pivot counterclockwise about the stub Y cam 105 secured to the then stationary X yoke member 55. Such pivotal movement causes the connecting rod 112, secured at one end to the Y cross-slide plate 82 (best seen in FIGS. 1 and 2), to drive the latter upwardly as viewed in the cited figures. In this manner the terminal board 115, supported on the rotatable and indexable index table 32 (depicted in FIGS. 1 and 3), is indexed in incremental steps so that terminal locations designated No. 1 through No. 7 on the circuit board 115 are successively aligned under a particular one of the terminal insertion tools 121 of the operating head 118.

Thereafter, the rotational drive unit 35 is operated (either by manual or automatic control) so as to position the terminal board 115 in the position shown in solid line form in FIG. 10. At this point, the index table must be indexed along the X axis again, to the right as viewed in FIG. 10, so as to align terminal location No. 8 beneath a terminal insertion tool 121. Such X displacement only is actually effected, as previously described, by having the corresponding effective portions of the X and Y cam grooves 66 and 92, respectively, oriented relative to each other in such a manner (as depicted in FIG. 6), that the X-initiated Y displacement cancels the Y-initiated Y displacement. From terminal location No. 8, the terminal board is indexed successively so that terminal locations 9–No. 12 are brought into alignment with one of the terminal insertion tools 121 in the same manner as described above in connection with terminal locations 1–No. 7.

It is significant to note that it is because of the utilization of the floating Y cam follower arm 101 that the incremental index positions of each Y row may be independent of those in every other Y row. This follows because the index displacements in each Y row are determined by a different portion (or face) of the Y cam groove 92. As such, each Y row need not encompass 360° (or some recurring fractional portion thereof) of Y roll cam rotation and, even when it does, the end Y index position in one row, such as terminal location No. 17 depicted in FIG. 10, does not and, in fact, cannot correspond with the same cam groove point associated with terminal location No. 18.

Considered another way, each incremental X roll cam initiated Y displacement, even when cancelled out by a counter Y roll cam initiated displacement, effectively presents a new Y cam groove portion 92 to the Y cam follower 97 because the Y roll cam 90 has continued to rotate with the X roll cam, notwithstanding the fact that there has been no net Y displacement of the index table.

The only exceptions to continuously generated new cam groove portions occurs at opposite ends of both the X and Y cam grooves 66 and 92, respectively. In these end regions, as a close examination of FIG. 3 will reveal, the X and Y cam grooves are actually formed with closed-loop portions, each resulting in an associated cross-over. The reason for these closed-loop end portions is to protect the drive mechanism from jamming should the control circuitry for the reversible motor driving the cam shaft 68 malfunction, which situation could otherwise result in the X and Y cam followers 71 and 97, respectively, abruptly being stopped at positive terminating ends of the associated cam grooves.

Consideration will now be directed to the manner in which the index table 32 is incrementally indexed by compound X and Y displacement so as to transpose terminal locations No. 12 and No. 13 and No. 42 and No. 43, for example, of the terminal board 115 depicted in FIG. 10, beneath an operating insertion tool. In effecting such compound displacement, the Y roll cam initiated Y displacement is actually employed to diminish or reduce the larger, and controlling X roll cam initiated Y displacement. More specifically, and with particular reference to FIGS. 10 and 12, if the X component only of the compound X-Y table displacement for each of the indexing transitions in question is considered arbitrarily to be 100 percent, this, in turn, will initiate a certain degree of X-initiated Y displacement which, for purposes of discussion, may also be arbitrarily considered to be 100 percent (see FIG. 12). What this actually means in the illustrative application is that the Y roll cam initiated Y displacement must be utilized to diminish, or reduce, the X roll cam initiated Y displacement or, in other words, cancel out a portion of the otherwise realized X-initiated Y displacement.

This is, of course, readily accomplished in accordance with the principles of the present invention by simply forming the effective portion of the Y cam groove, such as 92' shown in phantom in FIG. 6, with a pitch, or a degree of angular orientation, sufficient to counteract or reduce the X-initiated Y displacement by the requisite amount. As depicted in the two-dimensional cam profile layout in FIG. 12, the transition from terminal location No. 12 to No. 13 actually involves a physical X roll cam initiated Y displacement of approximately 0.644 inches (arbitrarily chosen to be 100 percent), and an effective counter Y roll cam initiated Y displacement of approximately 79.5 percent (relative to the previous, arbitrarily chosen 100 percent). This results in a net Y displacement of 100 − 79.5 = 20.5 percent of the otherwise realized 100 percent X initiated Y displacement. Stated another way, a displacement of 0.644 inches of the X cross-slide assembly 25 (which attempts to produce a clockwise rotation of the L-shaped cam follower arm 101 as depicted in FIG. 6), and an opposite Y displacement of 0.512 inches of the Y cross-slide assembly 27 (which attempts to rotate the Y cam follower arm 101 in a counterclockwise direction) results in a net physical Y displacement of 0.644 − 0.512 = 0.132 inches, which effects the transition between terminal locations No. 12 and No. 13.

With respect to the index table transition between terminal locations No. 42 and No. 43, it is seen that the effective net Y displacement must be larger than for the transition between terminal locations No. 12 and No. 13. Accordingly, for an X roll cam initiated Y displacement of 0.644 inches (again arbitrarily chosen as 100 percent), and for an effective counter Y roll cam initiated Y displacement of 0.290 inches (45 percent of the arbitrarily chosen 100 percent displacement), there results a net Y displacement of approximately 0.354 inches, or 55 percent of the otherwise realized X-initiated Y displacement.

It should be noted that in indexing in reverse, i.e., from terminal location No. 49 to No. 1, the operator would normally take the completely assembled terminal board 115 (with all of the terminals 119 previously inserted therein) off of the index table 32, while it was resting in the horizontal position depicted in FIG. 10. A new terminal board 115 would then be placed on the index table in the horizontal position and thereafter indexed to the left by the distance X' depicted in FIG. 10, followed by successive indexing through terminal locations 49–No. 8. At that point, the terminal board would be oriented 90° (counterclockwise) about the pivot point designated A in FIG. 10, by the energization of the rotational drive unit 35 (best seen in FIGS. 1 and 3), followed by successive indexing through terminal locations 7–No. 1, relative, of course, to an associated stationary terminal insertion tool 121.

In view of the foregoing, it becomes readily apparent that X and Y index table displacement does not have to take place orthogonally along a uniform set of coordinate index positions, but rather, may take place orthogonally or through compound X-Y displacement in a manner which may readily accommodate a random pattern of index points. Such non-coordinate displacements are limited only by the proximity of two adjacent points. The spacing between points, of course, is determined primarily by the physical size of the cams, cam follower and the associated cam follower arm ratios employed for any one particular application.

It should also be readily understood that even more complex indexing patterns than described hereinabove may be readily effected by mounting the X and Y cams 65 and 90, respectively, on separate shafts for selective or sequential driving at the same or differnet constant or variable speeds. With respect to the X and Y cams per se, it should also be appreciated that the active index-defining cam groove portions thereof may just as readily be formed in the side face of a circular cam, such as in the form of stepped spirals, as in the peripheral face or surface of a roll cam.

In conjunction with the described types of selective X, Y and angular displacements of the index table 32, selective table displacement along the Z axis could also be readily accomplished by providing the X and/or Y roll cam, for example, with a circumferentially disposed stepped cam surface having regions of different radii. With such a cam face a Z cam follower could then be coupled to the X and/or Y cross-slide assembly in such a manner as to effect selective Z axis displacement of an associated index table.

Considering the versatility of the present indexing drive mechanism in connection with two additional modes of operation, attention is now directed to FIG. 8. For the type of angular orientation of the X cam groove 65 illustrated, and with no angular orientation of the Y cam groove 92, as depicted by the solid line cam groove, lateral movement of the X cross-slide assembly 25 to the right will, as previously pointed out, cause the floating cam follower arm 101 to move with the stub shaft 105 on which it is mounted. With no Y cam initiated Y displacement, the cam follower arm 101 will effectively pivot about the Y cam follower 97 causing downward movement of the Y cross-slide assembly 27, as viewed in FIG. 2.

In applications where such Y displacement may be sufficient without any angular orientation of the Y cam groove 92, the spacing between adjacent Y cam groove convolutions may, of course, be limited by only the necessary wall thickness separating adjacent grooves. It should be appreciated, of course, that the X-initiated Y displacement is dependent on both the direction of displacement of the X cross-slide assembly 25, and on the direction of rotation of the X roll cam.

Also illustrated in FIG. 8 is another fragmentary portion of the Y cam groove designated 92'', shown in phantom, wherein the angular orientation is in a direction opposite to that of the corresponding laterally disposed X cam groove portion 66. Such oppositely inclined cam groove portions produce X roll cam initiated Y displacement and Y roll cam Y displacement which are additive, and, as such, clearly demonstrates the possible mechanical leverage advantage that is realized through the use of the Y floating pivotal cam follower arm 101. As such, it is readily possible to effect a substantially larger Y displacement than otherwise possible by either X roll cam initiated Y displacement or Y roll cam initiated Y displacement for a given degree of angular displacement of either the X or Y cam grooves. This type of amplified displacement, of course, substantially minimizes the lateral surface area required to effect any given Y displacement, in particular, and thereby allows the number of helical cam groove convolutions formed in the X and Y roll cam surfaces to be maximized.

In summary, it has been shown that the unique X-Y indexing apparatus embodied and claimed herein is capable of indexing not only along uniformly defined X-Y coordinate points forming a matrix or pattern, but also along a selective combination of coordinate and random index points, or all random index points forming a matrix. In addition, compound X and Y displacement, with or without sequential index table rotation, may be employed in indexing to either coordinate or non-coordinate points forming a predetermined pattern. Moreover, such indexing is accomplished in a manner that substantially minimizes the X and Y roll cam peripheral surface areas otherwise required to accommodate any particular number of X and Y rows, and associated index positions in any one row.

What is claimed is:

1. An indexing drive mechanism comprising: rotatably driven X-Y cam means having respective X and Y cam grooves, each having a spaced series of stepped index-defining portions, formed in at least one cam face thereof;

an X cross-slide assembly, including an X cam follower communicating with said X cam groove, slidably mounted for X displacement, the direction and magnitude of said displacement being dependent on both the degree of angular orientation of any given stepped X index-defining cam groove portion relative to the axis of said cam means, and on the direction of rotation of said cam means;

a Y cross-slide assembly slidably mounted on and movable in a Y direction relative to the perpendicular movement of said X cross-slide assembly, and pivotal coupling means supported on and movable with said X cross-slide assembly, and indirectly connecting a Y cam follower communicating with said Y cam groove to said Y cross-slide assembly, said coupling means facilitating displacement of said Y cross-slide assembly not only selectively in response to any angular orientation of any given stepped Y index-defining cam groove portion communicating with said Y cam follower, relative to the axis of said cam means, but also selectively in response to any displacement of said X cross-slide assembly.

2. An indexing drive mechanism in accordance with claim 1 wherein said X and Y cam grooves each encompass more than 360° of curvature formed in at least one cam face of said rotatable cam means, and wherein said coupling means has an L-shaped configuration in at least one plane, and is pivotally mounted near the vertex thereof on a shaft secured to the X cross-slide assembly.

3. An indexing drive mechanism in accordance with claim 1 further comprising:

indexable auxiliary work support means, and a rotational drive mechanism interposed between and secured to said Y cross-slide assembly and said work support means so as to allow the latter to be selectively and simultaneously displaced in the angular, X and Y directions.

4. An indexing drive mechanism in accordance with claim 2 wherein said X and Y cam grooves are formed in the peripheries of separate X and Y roll cams mounted on a common shaft in juxtaposition, and further comprising:

an indexable work table, and a rotational drive mechanism interposed between and secured to said Y cross-slide assembly and said work table so as to allow the latter to be selectively and simultaneously displaced in the angular, X and Y directions.

5. In a multi-directional indexing apparatus for use in successively indexing supported auxiliary apparatus along a selectively determined pattern of coordinate-non-coordinate index positions, relative to a stationary point, the combination comprising:

a multi-revolution X roll cam having an X cam groove formed in and extending in essentially helical fashion axially along the periphery thereof, said cam groove having a series of stepped X index-defining portions spaced therealong;

a multi-revolution Y roll cam having a Y cam groove with a plurality of convolutions formed in and extending in essentially helical fashion axially along the periphery thereof, said Y cam groove having a series of stepped Y index-defining portions spaced in successive convolutions therealong;

means for rotatably driving said X and Y roll cams selectively in opposite directions;

an X cross-slide assembly, including an X cam follower communicating with said X cam groove, slidably mounted for X displacement, the direction and magnitude of said displacement being dependent on both the degree of angular orientation of any given stepped X index-defining cam groove portion relative to the axis of said X roll cam, and on the direction of rotation of said X roll cam;

a Y cross-slide assembly slidably mounted on and movable in a Y direction relative to the perpendicular movement of said X cross-slide assembly, and an X floating pivotal coupling means for interconnecting said X and Y cross-slide assemblies, said coupling means including a coupler having an L-shaped configuration in at least one plane, and being pivotally supported at the vertex region thereof to said X cross-slide assembly, a terminating end region of one leg portion of said L-shaped coupler supporting a Y cam follower which communicates with said Y cam groove, and the terminating end of the other leg portion of said coupler being connected to said Y cross-slide assembly, said coupling means allowing the direction and magnitude of displacement of said Y cross-slide assembly to be controlled selectively by both the degree of angular orientation of any given stepped X and Y cam groove index portions communicating with said associated X and Y cam followers, relative to the axes of said X and Y roll cams, respectively, and on the particular direction of rotation of said X and Y roll cams, whereby displacement of said Y cross-slide assembly may be initiated by displacement of said X cross-slide assembly independent of any Y roll cam initiated displacement of said Y cross-slide assembly.

6. In an indexing apparatus in accordance with claim 5, the combination further comprising:

indexable work support means, and a rotational drive mechanism secured to said Y cross-slide assembly and adapted to rotatably support said work support means in a manner that allows the latter to be selectively and simultaneously displaced in the angular, X and Y directions.

7. In an indexing apparatus in accordance with claim 5, the opposite ends of said X and Y cam grooves terminate in continuous, closed loop portions so as to prevent jamming of the cross-slide assemblies should the respective X and Y roll cams not be reversed after the associated X and Y cam followers reach the last stepped X and Y index-defining cam groove portions formed at either end in the respective roll cams.

8. In an indexing apparatus in accordance with claim 7, said stepped X and Y index-defining cam groove portions being formed with smooth, cycloidal type curvatures so as to minimize cam pressure angles and cam follower bounce, and said coupling means further including a connecting linkage coupled between the terminating end of the leg portion of said L-shaped coupler not associated with said Y cam follower and the Y cross-slide assembly.

9. In an indexing apparatus in accordance with claim 7, said X and Y cams being mounted on a common shaft in juxtaposed relationship, said stepped X and Y index defining cam groove portions being formed with sinusoidal curvatures so as to minimize cam pressure angles and cam follower bounce, and said combination further comprising:

an indexable work table, and a rotational drive mechanism secured to said Y cross-slide assembly and adapted to rotatably support said work table in a manner that allows the latter to be selectively and simultaneously displaced in the angular, X and Y directions.

10. A multi-directional indexing apparatus comprising:

reversible rotatably driven X-Y roll cam means having respective X and Ycam grooves, each having a spaced series of stepped index-defining portions, formed in at least one cam face thereof;

an X cross-slide assembly, including an X cam follower communicating with said X cam groove, slidably mounted for X displacement, the direction and magnitude of said displacement being dependent on both the degree of any angular orientation of any given stepped X index-defining cam groove portion relative to the axis of said cam means, and on the direction of rotation of said cam means;

a Y cross-slide assembly slidably mounted on and movable in a Y direction relative to the perpendicular movement of said X cross-slide assembly;

pivotal coupling means supported on and movable with said X cross-slide assembly, and indirectly connecting a Y cam follower communicating with said Y cam groove to said Y cross-slide assembly, said coupling means facilitating displacement of said Y cross-slide assembly not only selectively in response to any angular orientation of any given stepped Y index-defining cam groove portion communicating with said Y cam follower, relative to the axis of said cam means, but also selectively in response to any displacement of said X cross-slide assembly, with any X roll cam initiated Y cross-slide assembly displacement having the effect of presenting a new Y cam groove profile to said Y cam follower, even for Y coordinate index positions laterally disposed along a common X coordinate axis, and auxiliary apparatus support means at least indirectly mounted on said Y cross-slide assembly so as to be selectively and simultaneously indexable in the X and Y directions in response to any X and Y displacements of the X and Y cross-slide assemblies, respectively.

11. An indexing apparatus in accordance with claim 10 wherein said cam means comprises separate X and Y roll cams mounted on a common shaft in juxtaposition, with said X and Y cam grooves being formed in and extending in essentially helical fashion axially along the axes of said respective X and Y roll cams, and wherein said pivotal coupling means has an L-shaped configuration in at least one plane thereof, and is pivotally mounted near the vertex region thereof on a shaft secured to the X cross-slide assembly.

12. An indexing apparatus in accordance with claim 10 further comprising:

A rotational drive mechanism secured to said Y cross-slide assembly and being adapted to rotatably support said support means in a manner that allows the latter to be selectively and simultaneously displaced in the angular, X and Y directions.

13. An indexing apparatus in accordance with claim 11 further comprising:

a rotational drive mechanism secured through a mounting platform to said Y cross-slide assembly, and being adapted to rotatably support said support means in a manner that allows the latter to be selectively and simultaneously displaced in the angular, X and Y directions.

14. An indexing apparatus in accordance with claim 11 wherein the stepped index-defining portions of said X and Y cam grooves are formed with cycloidal curvatures so as to minimize pressure angles and cam follower bounce, and wherein the opposite ends of said X and Y cam grooves terminate in continuous, closed-loop portions so as to prevent jamming of the X and Y cross-slide assemblies should the respective X and Y cam followers be allowed to pass beyond the last stepped X and Y index-defining cam groove portions formed in and located at either end region of the respective X and Y roll cams.

15. A multi-directional indexing apparatus for use in successively indexing supported auxiliary apparatus along a selectively determined pattern of coordinate-non-coordinate index positions, relative to a stationary point, said apparatus comprising:

an X roll cam having an X cam groove formed in and disposed in essentially helical fashion axially along the periphery thereof so as to form a multi-revolution roll cam with no active, intermediate cam groove cross-overs, said X cam groove having a series of cycloidally stepped X index-defining portions spaced therealong;

a Y roll cam having a Y cam groove formed with a plurality of convolutions in and disposed in essentially helical fashion axially along the periphery thereof so as to form a multi-revolution roll cam with no active, intermediate cam groove cross-overs, said Y cam groove having a series of cycloidally stepped Y index-defining portions spaced in successive convolutions therealong;

means for rotatably driving said X and Y roll cams selectively in opposite directions;

an X cross-slide assembly, including an X cam follower communicating with said X cam groove, slidably mounted for X displacement, the direction and magnitude of said displacement being dependent on both the degree of any angular orientation of any given stepped X index-defining cam groove portion relative to the axis of said X roll cam, and on the direction of rotation of said X roll cam;

a Y cross-slide assembly slidably mounted on and movable in a Y direction relative to the perpendicular movement of said X cross-slide assembly; said Y an X floating pivotal coupling means for interconnecting said X and Y cross-slide assemblies, said coupling means including a coupler having an L-shaped configuration in at least one plane, and being pivotally supported at the vertex region thereof to said X cross-slide assembly, a terminating end region of one leg portion of said L-shaped coupler supporting a Y cam follower which communicates with said Y cam groove, and the terminating end of the other leg portion of said coupler being connected through a linkage to said Y cross-slide assembly, said coupling means being capable of providing an indexing mechanical leverage and allowing the direction and magnitude of displacement of said Y cross-slide assembly to be controlled selectively by both the degree of angular orientation of said stepped X and Y cam groove index portions relative to the axes of said X and Y roll cams, respectively, and on the particular direction of rotation of said X and Y roll cams, whereby displacement of SAID said cross-slide assembly may be initiated by displacement of said X cross-slide assembly independent of any Y roll cam initiated displacement of said Y cross-slide assembly, and in a manner that effectively presents a new Y cam groove profile to the Y cam follower, even for Y coordinate index positions laterally disposed along a common X coordinate axis, and indexable work support means at least indirectly mounted on said Y cross-slide assembly so as to be selectively and simultaneously indexed in the X and Y directions in response to any X and Y displacements of said X and Y cross-slide assemblies, respectively.

16. An indexing apparatus in accordance with claim 15 further comprising:

a reversible and sequentially operable rotational drive mechanism secured through a supporting platform to said Y cross-slide assembly, and being adapted to rotatably support said work support means in a manner that allows the latter to be selectively and simultaneously displaced in the angular, X and Y directions.

17. An indexing apparatus in accordance with claim 15 wherein said X and Y roll cams each have continuous, closed-loop cam groove portions formed at opposite ends thereof so as to allow the respective X and Y followers to continuously communicate therewith should said followers move past the last respective stepped X and Y cam groove index portions formed near either end of said associated roll cams.

18. An indexing apparatus in accordance with claim 15 further comprising:

a frame for said apparatus including an oil confining reservoir for said X and Y roll cams, and a cover plate assembly including a slidable protective member supported about its peripheral edges within a recessed channel of an auxiliary member, with said protective and auxiliary members having suitable apertures formed therein so as to allow said work support means to be supported on said Y cross-slide assembly and to extend outwardly through said apertures.

* * * * *